US012168283B2

(12) United States Patent
Cholst et al.

(10) Patent No.: US 12,168,283 B2
(45) Date of Patent: Dec. 17, 2024

(54) QUICK RELEASE SOCKET

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US); Emily Genevriere, San Jose, CA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 323 days.

(21) Appl. No.: 17/703,040

(22) Filed: Mar. 24, 2022

(65) Prior Publication Data

US 2022/0305626 A1 Sep. 29, 2022

Related U.S. Application Data

(60) Provisional application No. 63/165,897, filed on Mar. 25, 2021.

(51) Int. Cl.
*B25B 21/02* (2006.01)
*B25B 23/00* (2006.01)

(52) U.S. Cl.
CPC .......... *B25B 21/02* (2013.01); *B25B 23/0035* (2013.01)

(58) Field of Classification Search
CPC ..... B25B 13/06; B25B 21/02; B25B 23/0035; B25D 17/005
See application file for complete search history.

(56) References Cited

U.S. PATENT DOCUMENTS 3,260,541 A * 7/1966 Sadler ...................... F16D 1/116 403/325
7,121,774 B2 10/2006 Hirt et al.
7,997,169 B1 * 8/2011 Hack ................... B25B 23/0021 81/177.85
8,132,990 B2 * 3/2012 Bauman ............ B23B 31/20125 408/239 R
11,285,589 B2 * 3/2022 Chiang ............... B25B 23/0035
(Continued)

FOREIGN PATENT DOCUMENTS

CN 211137035 A 7/2020
EP 3307485 B1 * 12/2020 ............. B25B 13/06
KR 1020200102586 A 9/2020

OTHER PUBLICATIONS

International Search Report and Written Opinion for Application No. PCT/US2022/021649 dated Jul. 11, 2022 (12 pages).

*Primary Examiner* — David B. Thomas
(74) *Attorney, Agent, or Firm* — Quarles & Brady LLP

(57) ABSTRACT

A socket for use with an anvil of a rotary power tool includes a socket body with a driven end and a working end. The socket also includes a locking element adapted to engage a locking recess in the anvil. The locking element is positioned within a slot in the socket body and movable between a lock position and a release position. A locking sleeve surrounding the driven end of the socket body is also included. The locking sleeve is movable between a lock position and a release position. An engagement ring is included on the locking sleeve and is adapted to engage the locking element preventing radially outward motion of the locking element when in the lock position. The socket also includes a first spring adapted to bias the locking element toward the lock position, and a second spring adapted to bias the locking sleeve toward the lock position.

20 Claims, 6 Drawing Sheets

(56) References Cited

U.S. PATENT DOCUMENTS

| | | | |
|---|---|---|---|
| 2014/0312578 A1 | 10/2014 | Puzio et al. | |
| 2015/0217434 A1 | 8/2015 | Funk et al. | |
| 2019/0152029 A1* | 5/2019 | Chiang | B25B 13/06 |
| 2020/0139522 A1 | 5/2020 | Chiang et al. | |
| 2021/0023629 A1 | 1/2021 | Kawai et al. | |
| 2023/0072364 A1* | 3/2023 | Hack | B25B 13/06 |

* cited by examiner

QUICK RELEASE SOCKET

CROSS-REFERENCE TO RELATED APPLICATIONS

This application claims priority to U.S. Provisional Patent Application No. 63/165,897, filed on Mar. 25, 2021, the entire content of which is incorporated herein by reference.

FIELD OF THE INVENTION

The present invention relates to rotary power tools, and more particularly to sockets for use with rotary power tools.

BACKGROUND OF THE INVENTION

Power tools, such as rotary power tools (e.g., drill drivers, impact drivers, impact wrenches, etc.) deliver rotational torque to a workpiece. Such torque is typically delivered through an output shaft capable of holding a tool bit.

SUMMARY OF THE INVENTION

The present invention provides, in one aspect, a socket for use with an anvil of a rotary power tool. The socket includes a cylindrical socket body with a driven end and a working end. The driven end includes a receptacle in which a drive end of the anvil having a corresponding shape is receivable in an axial direction. The socket also includes a locking element adapted to engage a locking recess in the anvil. The locking element is positioned within a slot in the driven end of the socket body and movable within the slot between a lock position, in which a portion of the locking element protrudes into the receptacle, and a release position. A locking sleeve which surrounds the driven end of the socket body is also included in the socket. The locking sleeve is movable between a lock position and a release position. An engagement ring is included on the locking sleeve and is adapted to engage the locking element preventing radially outward motion of the locking element when the locking sleeve is in the lock position. The socket also includes a first spring adapted to bias the locking element toward the lock position, and a second spring adapted to bias the locking sleeve toward the lock position.

The present invention provides, in another aspect, a rotary power tool assembly including an anvil rotatable about a longitudinal axis that has a drive end and a circumferential recess proximate the drive end, and a socket. The socket includes a cylindrical socket body having a driven end and a working end, where the driven end includes a receptacle in which the drive end of the anvil having a corresponding shape is received along the longitudinal axis. The socket also includes a locking element received in the circumferential recess in the anvil. The locking element is positioned within a slot in the driven end of the socket body and movable within the slot between a lock position, in which a portion of the locking element protrudes into the receptacle, and a release position. A locking sleeve surrounds the driven end of the socket body and is movable between a lock position and release position. The locking sleeve includes an engagement ring adapted to engage the locking element and prevent radially outward motion of the locking element, thus maintaining the locking element within the circumferential recess when the locking sleeve is in the lock position. The socket also includes a first spring adapted to bias the locking element toward the lock position, and a second spring adapted to bias the locking sleeve toward the lock position.

The present invention provides, in yet another aspect, a method of coupling a socket to an anvil of a rotary power tool. The socket includes a body and a locking sleeve. The method includes inserting a driven end of the anvil into a receptacle of the socket, axially displacing a locking element relative to an engagement ring of the locking sleeve, radially displacing the locking element into an annular recess disposed adjacent the engagement ring, and radially displacing the locking element into a circumferential recess in the anvil, thereby locking the socket onto the anvil.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
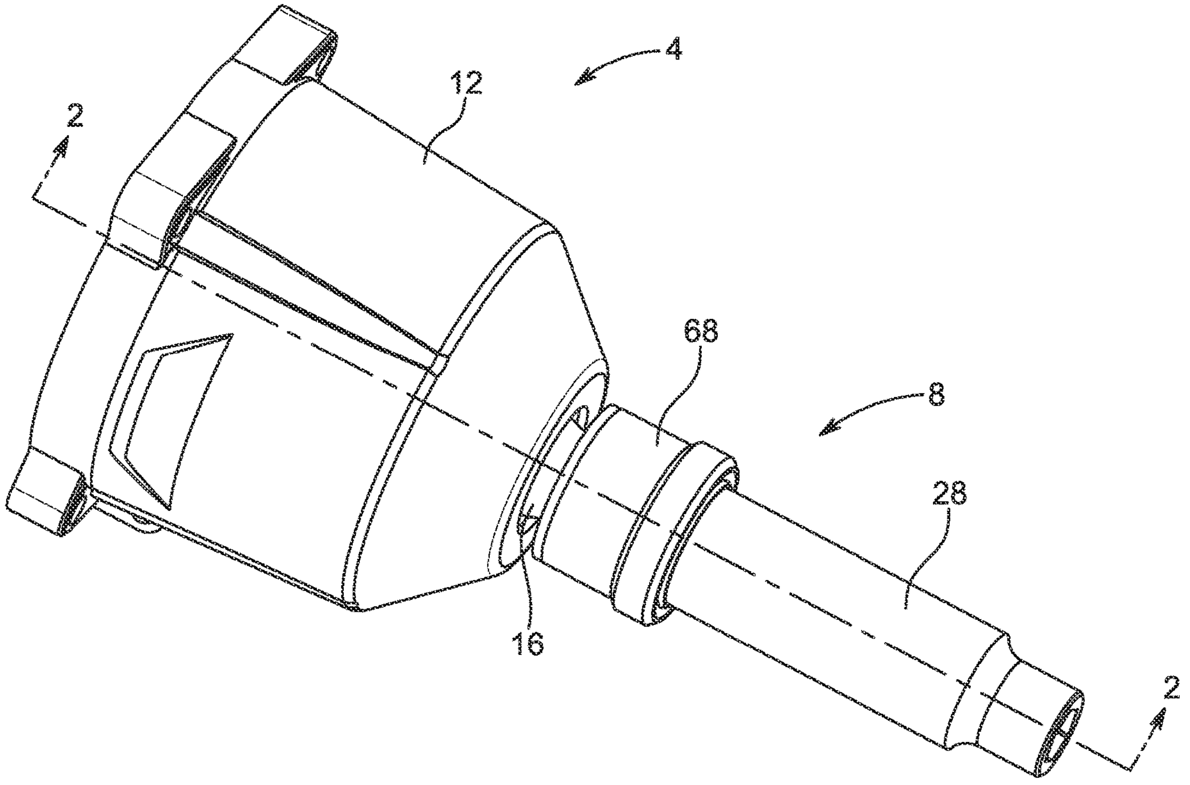
FIG. 1 is a perspective view of a rotary power tool assembly in accordance with an embodiment of the invention, illustrating a portion of a rotary power tool and an attached socket.
Figure 2:
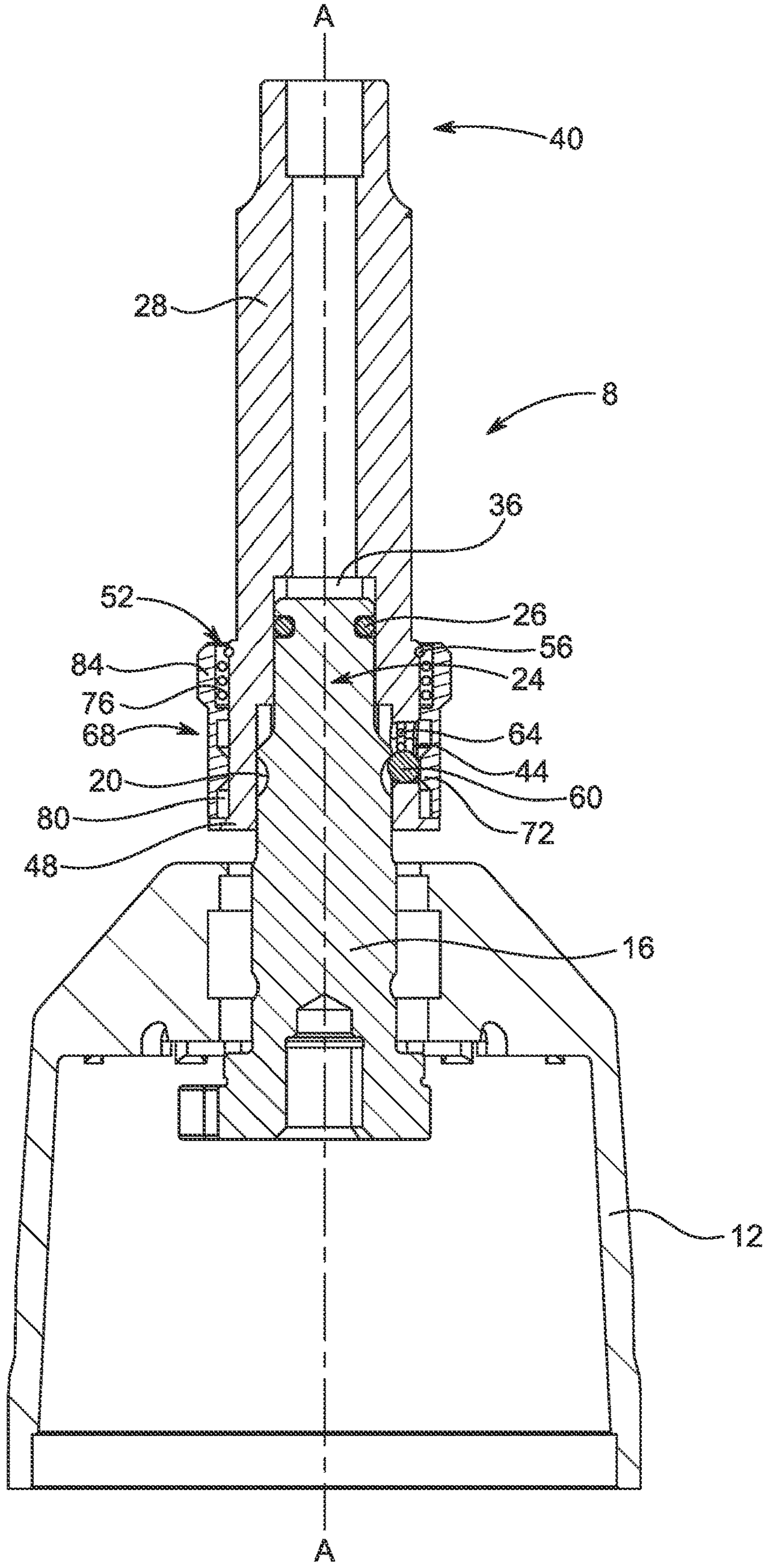
FIG. 2 is a cross-sectional view of the rotary power tool assembly of FIG. 1 through section line 2-2 in FIG. 1.

With reference to FIG. 1, a rotary power tool assembly is shown including a rotary power tool 4 (e.g., a rotary impact wrench) and an attached socket 8. Only a portion of the tool 4, a front housing 12 and an anvil 16 protruding from the front housing 12, is shown. In operation, the anvil 16 receives torque from a motor (not shown), causing the anvil 16 to rotate about a longitudinal axis A (FIG. 2). The tool 4 also includes a rotary impact mechanism (not shown) at least partially located within the front housing 12, which is configured to impart striking rotational impacts or torque impulses to the anvil 16 in response to a reaction torque exerted on the anvil 16 exceeding some predetermined amount. The anvil 16, therefore, transmits continuous torque or torque impulses to the socket 8 for performing work on a workpiece (e.g., tightening or loosening a fastener).

With reference to FIG. 2, a circumferential recess 20 is axially located on the anvil 16 near a driving end 24. In some embodiments, a friction ring 26 is located on the circumference of the anvil 16 between the circumferential recess 20 and the driving end 24 to help retain the socket 8 to the anvil 16. Further details of the socket 8 are described below.

Figure 3:
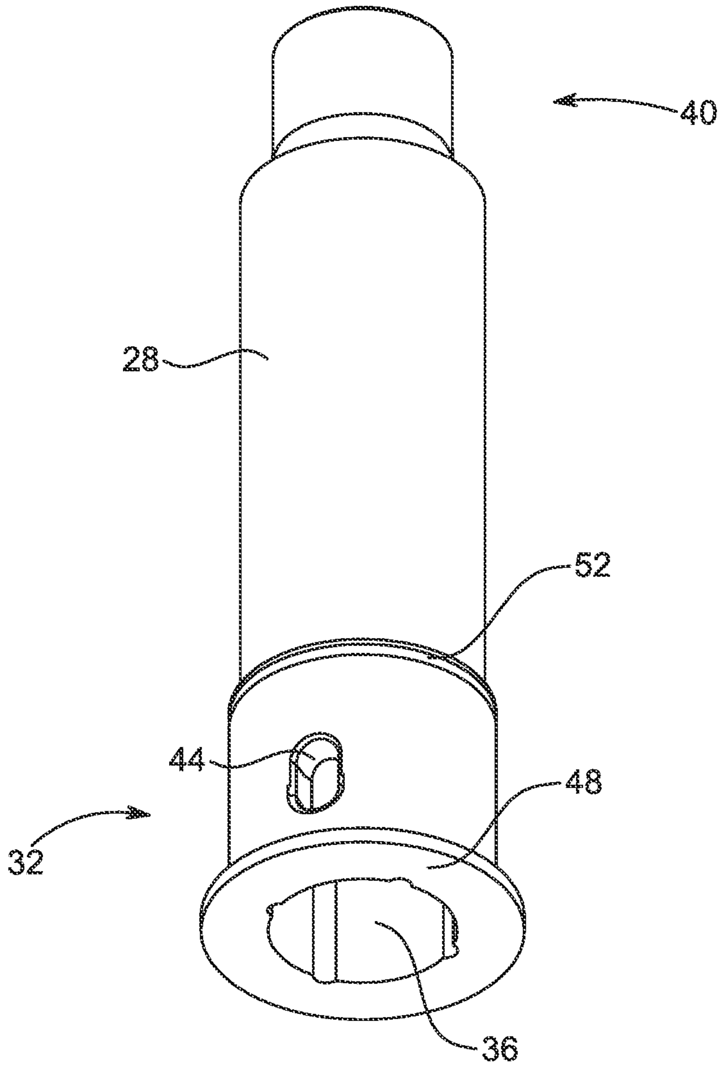
FIG. 3 is a rear perspective view of a portion of the socket of FIG. 1.

With reference to FIG. 3, the socket 8 includes a cylindrical body 28 having two ends spaced along an axis. When installed on the power tool 4, the cylindrical body 28 is coaxial with the longitudinal axis A of the anvil 16 (FIG. 2). At one end of the cylindrical body 28 is a driven end 32. The driven end 32 of the cylindrical body 28 includes a receptacle 36 shaped to receive the driving end 24 of the anvil 16. Opposite the driven end 32 of the cylindrical body 28 is a working end 40 shaped to engage a workpiece. In some embodiments, the working end 40 is a hexagonal bore. A radially extending slot 44 extends between the exterior surface of the cylindrical body 28 and the receptacle 36, and extends axially along a portion of the cylindrical body 28 proximate to the driven end 32. Also located at the driven end 32 is a shoulder 48 that extends radially outward from the exterior surface of the cylindrical body 28. Located axially between the shoulder 48 and the working end 40 of the cylindrical body 28 is a circumferential groove 52 adapted to receive a retaining ring 56.

With further reference to FIG. 2, a locking element 60 is located within the slot 44. In some embodiments, the locking element 60 is a ball detent. The slot 44 allows for displacement of the locking element 60, between a lock position and a release position, during installation or removal of the socket 8 from the anvil 16. In the lock position, a portion of the locking element 60 radially extends into the receptacle 36 and is adapted to engage the circumferential recess 20 of the anvil 16. In the release position, no portion of the locking element 60 extends into the receptacle 36. A first biasing member 64, such as a spring, is adapted to bias the locking element 60 toward the lock position.

With continued reference to FIG. 2, the socket 8 also includes a locking sleeve 68 surrounding the driven end 32 of the cylindrical body 28 and is axially movable along the cylindrical body 28 between a sleeve lock position and a sleeve release position. The locking sleeve 68 covers the locking element 60 and prevents the removal of the locking element 60 from the slot 44, which is also tapered in a radially inward direction to prevent the locking element 60 from falling into the receptacle 36. Axial motion of the locking sleeve 68 is limited by the shoulder 48 and the retaining ring 56. In other words, the locking sleeve 68 is located axially between the shoulder 48 and the retaining ring 56 and cannot be moved beyond the driven end 32 of the cylindrical body 28 or the retaining ring 56. The locking sleeve 68 includes an internal engagement ring 72 to engage the locking element 60. The engagement ring 72 extends radially inward from an inner surface of the locking sleeve 68 and is located at a position axially aligned with the locking element 60 when both the locking element 60 and the locking sleeve 68 are in their respective lock positions. While in the lock positions, the engagement ring 72 engages the locking element 60 to prevent radially outward motion of the locking element 60, thereby maintaining the locking element 60 within the circumferential recess 20 of the anvil 16. A second biasing member 76, such as a second spring, is seated against the retaining ring 56 on a first side and against the locking sleeve 68 on a second side. The second biasing member 76 is adapted to bias the locking sleeve 68 toward the lock position. Adjacent to the engagement ring 72 within the locking sleeve 68 is an annular recess 80. The annular recess 80 provides a space for the locking element 60 to be displaced during installation of the socket 8. In some embodiments, the locking sleeve 68 also includes a grip 84 extending radially outward from an outer surface of the locking sleeve 68 and adapted to facilitate axial movement of the locking sleeve 68 between the lock position and the release position.

Figure 4A:
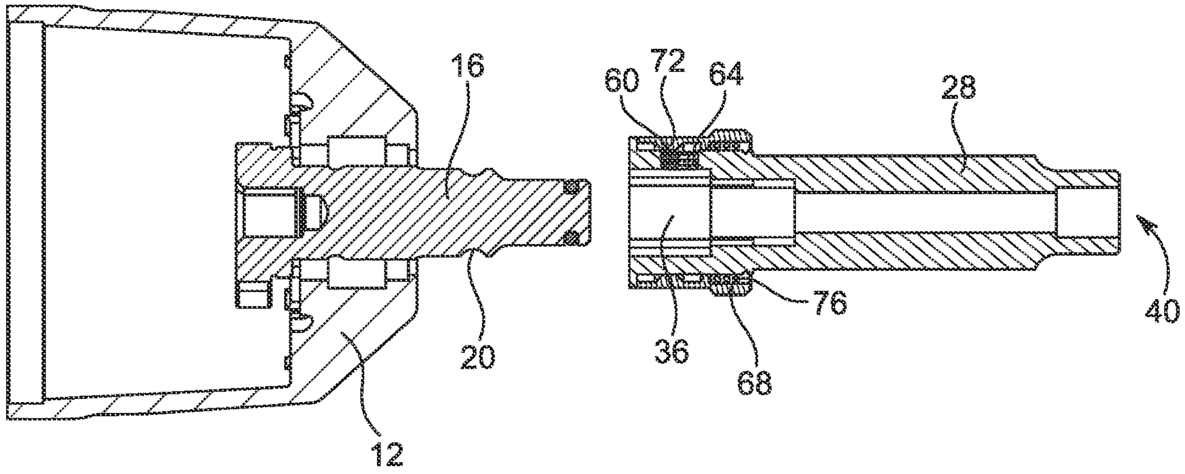
FIGS. 4A-4D are a stepwise depiction of the installation of the socket on an anvil of the rotary power tool of FIG. 1.
Figure 4B:
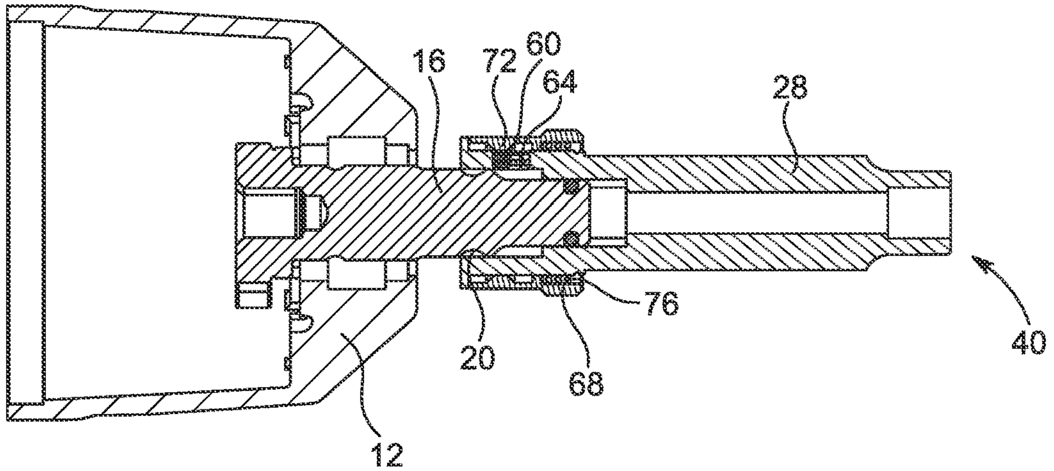
Figure 4C:
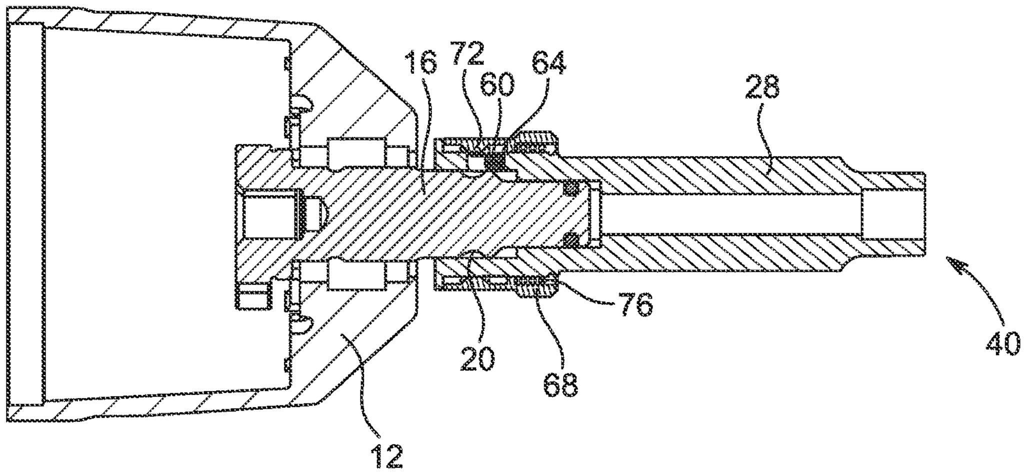
Figure 4D:
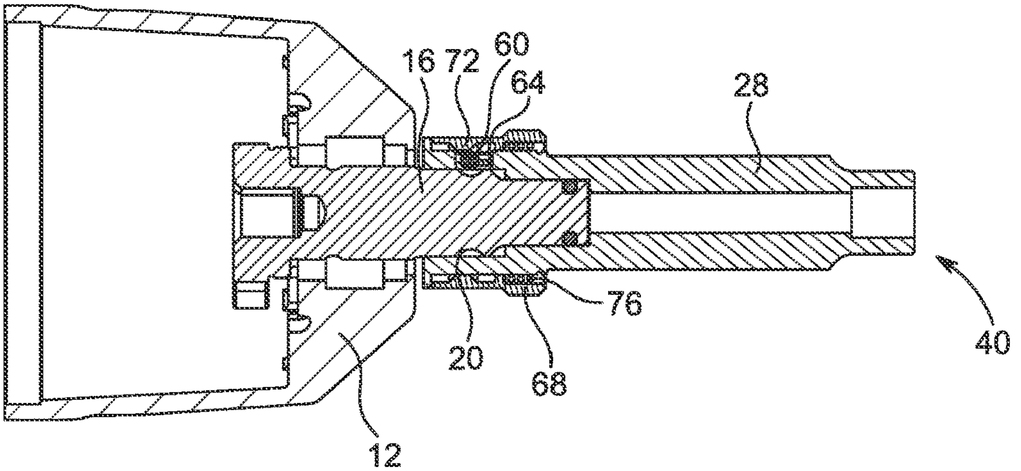

FIGS. 4A-4D depict a stepwise installation of the socket 8 on the anvil 16. Starting with the socket 8 separated from the anvil 16 in FIG. 4A, the locking sleeve 68 and locking element 60 are located at their respective lock positions as biased by the biasing members 64, 76. The body 28 of the socket 8 is then moved axially toward the anvil 16 so that the driving end 24 of the anvil 16 begins to enter the receptacle 36 within the driven end 32 of the cylindrical socket body 28. As the anvil 16 enters the receptacle 36, it contacts the portion of the locking element 60 radially protruding through the slot 44. At this point, the locking element 60 is aligned with the engagement ring 72 so that the locking element 60 is prevented from moving radially outward (FIG. 4B). As the anvil 16 further enters the receptacle 36, the locking element 60 is axially displaced within the slot 44 in a rearward direction until the locking element 60 is located rearward of the engagement ring 72 (FIG. 4C). Continued insertion of the anvil 16 into the receptacle 36, in sequence, radially displaces the locking element 60 into the annular recess 80 that is adjacent the engagement ring 72 and then brings the circumferential recess 20 of the anvil 16 to an axial position that is aligned with the locking element 60. Alignment of the circumferential recess 20 and locking element 60 results in the radially inward displacement of the locking element 60 by the rebounding first biasing member 64 until it is fully engaged with the circumferential recess 20 of the anvil 16 and the locking element 60 is again returned to a position in which it is radially inward of the engagement ring 72. The socket 8 is now installed on the anvil 16 (FIG. 4D). At no point during the installation is the locking sleeve 68 moved from the lock position. As such, the socket 8 can be installed onto the anvil 16 without first retracting the locking sleeve 68 to its release position, permitting the user to only use a single hand when attaching the socket 8 to the anvil 16. With the locking sleeve 68 in the lock position, the locking element 60 is held captive between the circumferential recess 20 and the engagement ring 72, effectively locking the anvil 16 and the socket 8 together.

Figure 5A:
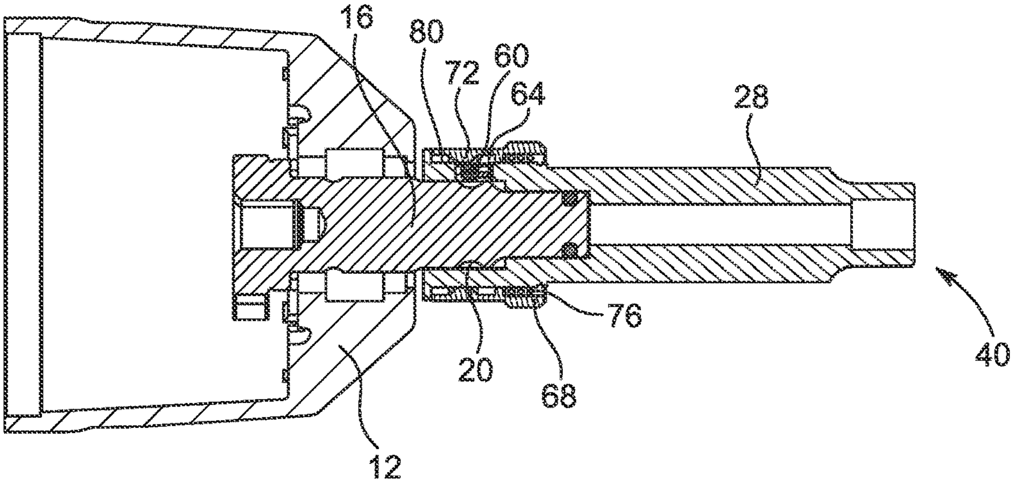
FIGS. 5A-5D are a stepwise depiction of the removal of the socket from the rotary power tool anvil.
Figure 5B:
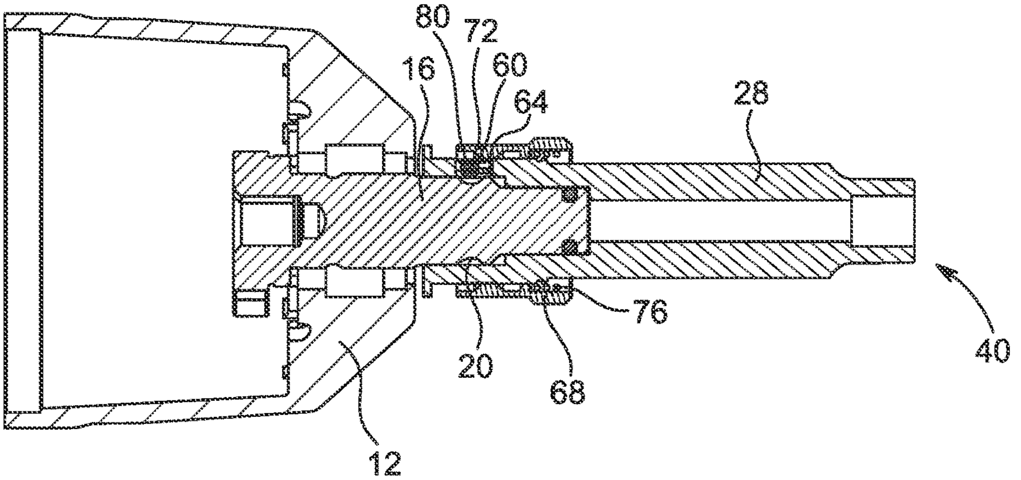
Figure 5C:
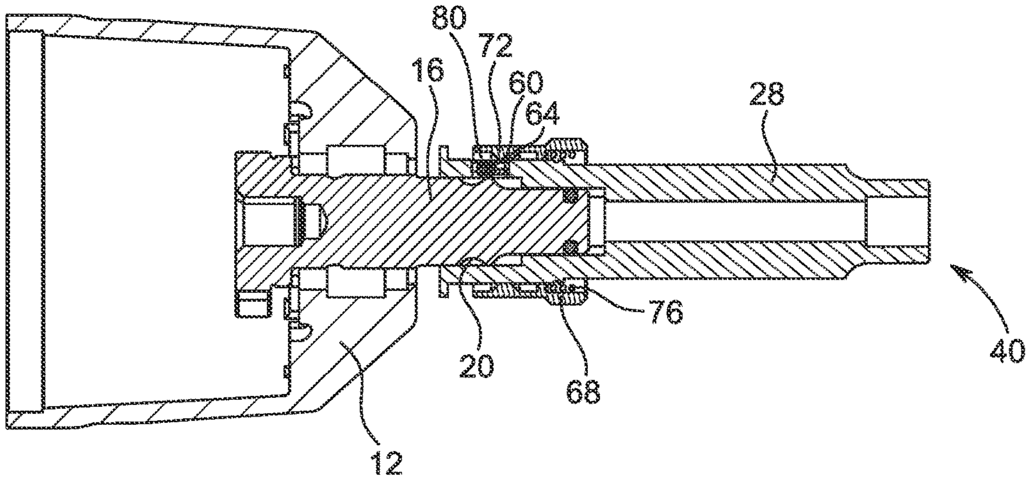
Figure 5D:
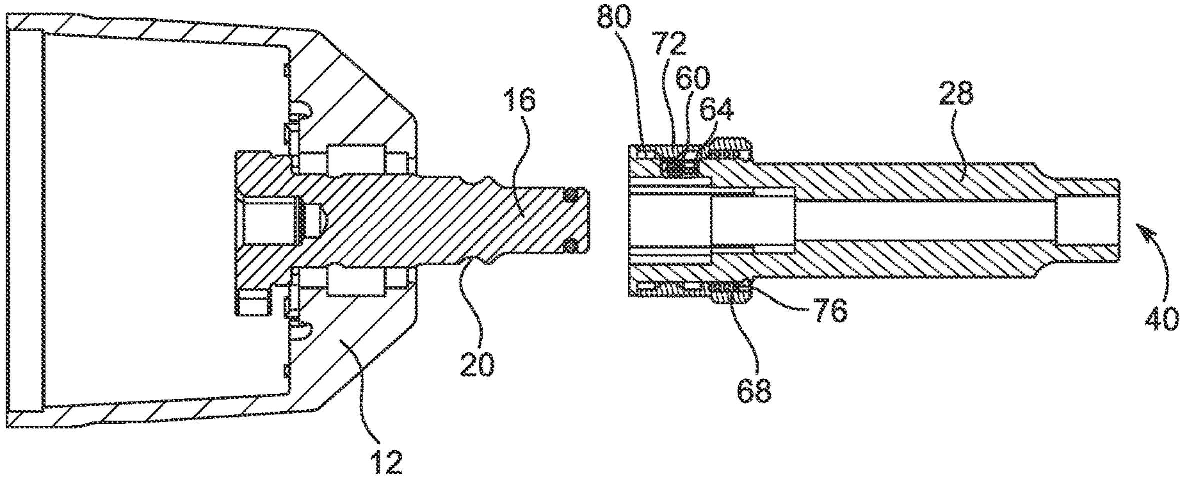

FIGS. 5A-5D depict a stepwise removal of the socket 8 from the anvil 16. First, the locking sleeve 68 is axially displaced along the cylindrical socket body 28 to its release position (FIG. 5B). In the release position, the engagement ring 72 of the locking sleeve 68 is misaligned with the locking element 60, which instead is aligned with the annular recess 80. The socket body 28 is then displaced axially away from the anvil 16. The circumferential recess 20 directs the locking element 60 to move radially outward until the locking element 60 is in the release position and has disengaged from the circumferential recess 20, thereby allowing the socket 8 to be removed from the anvil 16 (FIG. 5C). Once the socket 8 is fully removed from the anvil 16 and the locking sleeve 68 released by the user, the first and second biasing members 64, 76 return the locking element 60 and locking sleeve 68 to their respective lock positions (FIG. 5D).

Although the invention has been described in detail with reference to certain preferred embodiments, variations and modifications exist within the scope and spirit of one or more independent aspects of the invention as described.

Various features of the invention are set forth in the following claims.

What is claimed is:

1. A socket for use with an anvil of a rotary power tool, the socket comprising:

a cylindrical socket body having a driven end and a working end, the driven end including a receptacle in which a drive end of the anvil having a corresponding shape is receivable in an axial direction;

a locking element adapted to engage a locking recess in the anvil, the locking element positioned within a slot in the driven end of the socket body and movable within the slot between a lock position, in which a portion of the locking element protrudes into the receptacle, and a release position;

a locking sleeve surrounding the driven end of the socket body, the locking sleeve movable between a lock position and a release position, the locking sleeve including an engagement ring adapted to engage the locking element, the engagement ring preventing radially outward motion of the locking element when the locking sleeve is in the lock position;

a first spring extending between the locking element and the socket body, the first spring adapted to bias the locking element toward the lock position; and a second spring adapted to bias the locking sleeve toward the lock position.

2. The socket of claim 1, wherein the socket body includes a shoulder extending radially outward from an exterior of the driven end, and wherein the shoulder is adapted to prevent removal of the locking sleeve from the socket body.

3. The socket of claim 2, further comprising a circumferential groove on an exterior of the socket body axially located between the shoulder and the working end.

4. The socket of claim 3, further comprising a retaining ring located in the circumferential groove, wherein a first end of the second spring is seated against the retaining ring.

5. The socket of claim 1, wherein, in response to insertion of the drive end of the anvil into the receptacle, the locking element is displaced from the lock position to the release position, in which the locking element is misaligned with the engagement ring on the locking sleeve, while the locking sleeve remains in the lock position.

6. The socket of claim 1, wherein the working end of the socket body includes a bore having a hexagonal cross-sectional shape.

7. The socket of claim 1, wherein the locking element is a ball detent.

8. A rotary power tool assembly comprising:

an anvil rotatable about a longitudinal axis and having a drive end and a circumferential recess proximate the drive end; and a socket including a cylindrical socket body having a driven end and a working end, the driven end including a receptacle in which the drive end of the anvil having a corresponding shape is received along the longitudinal axis, a locking element received in the circumferential recess in the anvil, the locking element positioned within a slot in the driven end of the socket body and movable within the slot between a lock position, in which a portion of the locking element protrudes into the receptacle, and a release position, a locking sleeve surrounding the driven end of the socket body, the locking sleeve movable between a lock position and a release position, the locking sleeve including an engagement ring adapted to engage the locking element, the engagement ring preventing radially outward motion of the locking element and maintaining the locking element within the circumferential recess when the locking sleeve is in the lock position, a first spring adapted to bias the locking element toward the lock position, and a second spring adapted to bias the locking sleeve toward the lock position.

9. The rotary power tool assembly of claim 8, wherein the socket body includes a shoulder extending radially outward from an exterior of the driven end, and wherein the shoulder is adapted to prevent removal of the locking sleeve from the socket body.

10. The rotary power tool assembly of claim 9, further comprising a circumferential groove on an exterior of the socket body axially located between the shoulder and the working end.

11. The rotary power tool assembly of claim 10, further comprising a retaining ring located in the circumferential groove, wherein a first end of the second spring is seated against the retaining ring.

12. The rotary power tool assembly of claim 8, wherein the working end of the socket body includes a bore having a hexagonal cross-sectional shape.

13. The rotary power tool assembly of claim 8, further comprising a friction ring on the drive end of the anvil engaged with the receptacle.

14. The rotary power tool assembly of claim 8, wherein the locking element is a ball detent.

15. The rotary power tool assembly of claim 8, wherein the locking sleeve further includes an annular recess adjacent the engagement ring.

16. The rotary power tool assembly of claim 8, wherein the locking sleeve further includes a grip extending radially outward from an outer surface of the locking sleeve.

17. The rotary power tool assembly of claim 8, wherein, in response to insertion of the drive end of the anvil into the receptacle, the locking element is displaced from the lock position to the release position, in which the locking element is misaligned with the engagement ring on the locking sleeve, while the locking sleeve remains in the lock position.

18. A method of coupling a socket to an anvil of a rotary power tool, the socket including a body and a locking sleeve, the method comprising:

inserting a driven end of the anvil into a receptacle of the socket;

axially displacing a locking element relative to an engagement ring of the locking sleeve;

radially displacing the locking element into an annular recess disposed adjacent the engagement ring; and radially displacing the locking element into a circumferential recess in the anvil, thereby locking the socket onto the anvil.

19. The method of claim 18, wherein the locking sleeve remains stationary in response to insertion of the driven end of the anvil into the receptacle of the socket.

20. The method of claim 18, further comprising translating the locking element relative to the socket in response to insertion of the driven end of the anvil into the receptacle of the socket.

* * * * *